United States Patent
Chang

(10) Patent No.: US 8,994,669 B2
(45) Date of Patent: Mar. 31, 2015

(54) DISPLAY WITH IN-CELL TOUCH SENSOR

(75) Inventor: Yih Chang, New Taipei (TW)

(73) Assignee: Arolltech Co., Ltd., Grand Cayman (KY)

( * ) Notice: Subject to any disclaimer, the term of this patent is extended or adjusted under 35 U.S.C. 154(b) by 995 days.

(21) Appl. No.: 13/069,722

(22) Filed: Mar. 23, 2011

(65) Prior Publication Data
US 2011/0242027 A1 Oct. 6, 2011

(30) Foreign Application Priority Data
Apr. 2, 2010 (TW) ............................. 099110282 A

(51) Int. Cl.
*G06F 3/041* (2006.01)
*G06F 3/047* (2006.01)

(52) U.S. Cl.
CPC .............. *G06F 3/0412* (2013.01); *G06F 3/047* (2013.01)
USPC ........................................................ 345/173

(58) Field of Classification Search
None
See application file for complete search history.

(56) References Cited

U.S. PATENT DOCUMENTS

| | | | | |
|---|---|---|---|---|
| 6,093,477 A * | 7/2000 | Matsufusa et al. | ............ | 428/209 |
| 6,188,391 B1 * | 2/2001 | Seely et al. | .................... | 345/173 |
| 6,573,155 B2 * | 6/2003 | Ahn et al. | ..................... | 438/455 |
| 2003/0076308 A1 * | 4/2003 | Sano et al. | .................... | 345/177 |
| 2005/0185129 A1 * | 8/2005 | Kim et al. | ..................... | 349/156 |
| 2005/0280961 A1 * | 12/2005 | Campolo | ........................ | 361/42 |
| 2007/0039706 A1 * | 2/2007 | Chen et al. | .................... | 162/301 |
| 2008/0007533 A1 * | 1/2008 | Hotelling | ...................... | 345/173 |
| 2008/0142352 A1 * | 6/2008 | Wright | ........................... | 200/600 |
| 2008/0198143 A1 * | 8/2008 | Kinoshita et al. | ............. | 345/175 |
| 2009/0051842 A1 * | 2/2009 | Kim et al. | ....................... | 349/40 |

(Continued)

FOREIGN PATENT DOCUMENTS

| | | |
|---|---|---|
| EP | 1624435 | 2/2006 |
| EP | 1554760 | 8/2009 |

(Continued)

OTHER PUBLICATIONS

Office Action with the search report dated Dec. 5, 2013 from Taiwan counterpart application 099110282.
English abstract translation of the Office Action with the search report dated Dec. 5, 2013 from Taiwan counterpart application 099110282.

(Continued)

*Primary Examiner* — Antonio Xavier
(74) *Attorney, Agent, or Firm* — WPAT, P.C.; Anthony King; Kay Yang

(57) ABSTRACT

The present invention discloses a display with in-cell touch sensors comprising a first substrate, a second substrate, and a touch sensor disposed on the second substrate. A thin-film transistor (TFT) array is disposed on a surface of the first substrate, and a color pixel array is disposed on a surface of the second substrate. The TFT array faces and is aligned with the color pixel array. The touch sensor comprises a plurality of electrodes, a plurality of first leads, and a plurality of first pads. Each of the first leads is connected to one of the electrodes and one of the first pads. There are a plurality of second pads, a plurality of second leads, a plurality of connecting wires, and a plurality of terminal pads. Each of the second leads connects one of the second pads and one of the connecting wires. At least one of the connecting wires simultaneously and electrically connects several of the second leads. Each of the connecting wires electrically connects at least one of the terminal pads. Each of the first pads electrically connects one of the second pads.

12 Claims, 8 Drawing Sheets

(56) References Cited

U.S. PATENT DOCUMENTS

| | | | |
|---|---|---|---|
| 2010/0085326 A1* | 4/2010 | Anno | 345/174 |
| 2010/0302178 A1* | 12/2010 | Liu et al. | 345/173 |
| 2010/0302206 A1* | 12/2010 | Yu et al. | 345/174 |
| 2011/0096017 A1* | 4/2011 | Li et al. | 345/174 |
| 2011/0187669 A1* | 8/2011 | Abiru et al. | 345/173 |
| 2011/0221697 A1* | 9/2011 | Okamoto et al. | 345/173 |

FOREIGN PATENT DOCUMENTS

| | | |
|---|---|---|
| JP | 2010020315 | 1/2010 |
| KR | 1020060055873 | 5/2006 |
| KR | 1020080104108 | 12/2008 |
| KR | 10-2010-0034436 | 4/2010 |
| KR | 1020100034436 | 4/2010 |
| TW | 200741318 | 11/2007 |
| TW | 200912430 | 3/2009 |
| TW | 201005947 | 2/2010 |
| TW | 201007261 | 2/2010 |

OTHER PUBLICATIONS

English abstract translation TW200912430, TW201007261, TW201005947, TW200741318, EP1554760 and EP1624435.
Office Action dated Sep. 3, 2012 from Korea counterpart application No. 10-2011-0028154 cites KR 10-2010-0034436.
English translation of Office Action dated Sep. 3, 2012 from Korea counterpart application No. 10-2011-0028154.
English translation of KR 10-2010-0034436.
Final Office Action issued Feb. 1, 2013 by KPO for the counterpart KR Patent Application No. 10-2011-0028154.
English Abstract of Final Office Action issued Feb. 1, 2013 by KPO for the counterpart KR Patent Application No. 10-2011-0028154.
English Abstract of Final Decision for Registration issued on Jun. 11, 2014 by KIPO for the counterpart KR application No. 10-2011-0028154 cited JP 2010020315A, KR 1020060055873, KR 1020080104108, and KR 1020100034436.
English Abstracts of JP 2010020315A, KR 1020060055873, KR 1020080104108, and KR 1020100034436.

\* cited by examiner

DISPLAY WITH IN-CELL TOUCH SENSOR

BACKGROUND OF THE INVENTION

1. Field of the Invention

The present invention relates to a display, and more particularly, to a display with in-cell touch sensor.

2. Description of the Related Art

Touch panels have been widely used in several fields such as house wares, ATM machines, communication apparatuses and electronic information devices. Among these fields, touch panels are mostly used as an input interface of TVs, smart phones, all-in-one PCs, notebooks, global positioning systems (GPS) and digital still cameras (DSC). That is, touch panels are mostly used as the media for selecting and operating displays, such as liquid crystal displays (LCD), active matrix organic light-emitting devices (AMOLED) and plasma displays. Currently, a touch panel can be integrated with a display such that a user can select representative icons shown on the selective panel by using a finger or a touch pen for the smart phones, GPS or DSC to execute a preferred function. This kind of touch panel can also be seen at public information inquiring system providing the public with an efficient operation system.

A conventional touch panel comprises a transparent substrate. This transparent substrate comprises a surface constituted by a plurality of sensing areas. These distributed sensing areas are used to sense the touch signals for input or control purposes, wherein the signals are generated when a finger or a touch pen touches these distributed sensing areas. Each of the sensing areas is constituted by a transparent conducting thin film, such as indium tin oxide (ITO), and a user can touch the transparent conducting thin film corresponding to a specific location on the display to effectively operate the apparatus containing the touch panel.

However, the overall thickness of the apparatus containing the touch panel is increased by utilizing the aforementioned combination of a display and a separate touch panel. In addition, the assembly and alignment of such a display and a touch panel creates another issue. Further, a plurality of photo etching processes are required to produce touch panel such that the etching processes for the transparent substrate cannot be integrated into the display manufacturing steps. In addition, the transmittance of the light and color rendering of overall display and touch panel may degrade due to one additional separate touch sensor on top of the display.

SUMMARY OF THE INVENTION

The present invention provides a display integrated with a touch control unit, or a display with in-cell touch sensor. Some materials used in conventional touch panels are not required in the disclosed display. Therefore, some part of the touch control unit is implemented into conventional display manufacturing processes, effectively reducing the display manufacture cost.

The display with in-cell touch sensor according to one embodiment of the present invention comprises a first substrate, a second substrate and a touch sensor disposed on the second substrate. A transistor array is disposed on a surface of the first substrate. A color pixel array is disposed on a surface of the second substrate. The color pixel array faces and is aligned with the transistor array. The touch sensor comprises a plurality of electrodes, a plurality of first leads and a plurality of first pads. Each of the first leads is connected to one of the electrodes and one of the first pads. A plurality of second pads, a plurality of second leads, a plurality of connecting wires and a plurality of terminal pads are disposed on the first substrate. Each of the second leads is connected to one of the second pads and one of the connecting wires. At least one of the connecting wires is electrically connected to several of the second leads. Each of the connecting wires is electrically connected to at least one of the terminal pads. Each of the first pads is electrically connected to one of the second pads.

The display with in-cell touch sensors according to another embodiment of the present invention comprises a first substrate, a second substrate and a touch sensor disposed on the second substrate. A transistor array is disposed on a surface of the first substrate. A color pixel array is disposed on a surface of the second substrate. The color pixel array faces and is aligned with the transistor array. The touch sensor comprises a plurality of electrodes, a plurality of first leads and a plurality of first pads. Each of the first leads is connected to one of the electrodes and one of the first pads. The plurality of first pads is divided into two groups, wherein one group comprises the first pads disposed on one side of the second substrate, and the other group comprises the first pads disposed on the other side of the second substrate. A plurality of second pads, a plurality of second leads, a plurality of connecting wires and a plurality of terminal pads are disposed on the first substrate. The plurality of second pads is divided into two groups, wherein one group comprises the second pads disposed on one side of the first substrate, and the other group comprises the second pads disposed on the other side of the first substrate. Each of the second leads is connected to one of the second pads and one of the connecting wires. At least one of the connecting wires is electrically connected to several of the second leads. Each of the connecting wires is electrically connected to at least one of the terminal pads. Each of the first pads is electrically connected to one of the second pads.

The foregoing has outlined rather broadly the features and technical advantages of the present invention in order that the detailed description of the invention that follows may be better understood. Additional features and advantages of the invention will be described hereinafter, and form the subject of the claims of the invention. It should be appreciated by those skilled in the art that the conception and specific embodiment disclosed may be readily utilized as a basis for modifying or designing other structures or processes for carrying out the same purposes as those of the present invention. It should also be realized by those skilled in the art that such equivalent constructions do not depart from the spirit and scope of the invention as set forth in the appended claims.

BRIEF DESCRIPTION OF THE DRAWINGS

The objectives and advantages of the present invention will become apparent upon reading the following description and upon referring to the accompanying drawings of which.

DETAILED DESCRIPTION OF THE INVENTION

Figure 1:
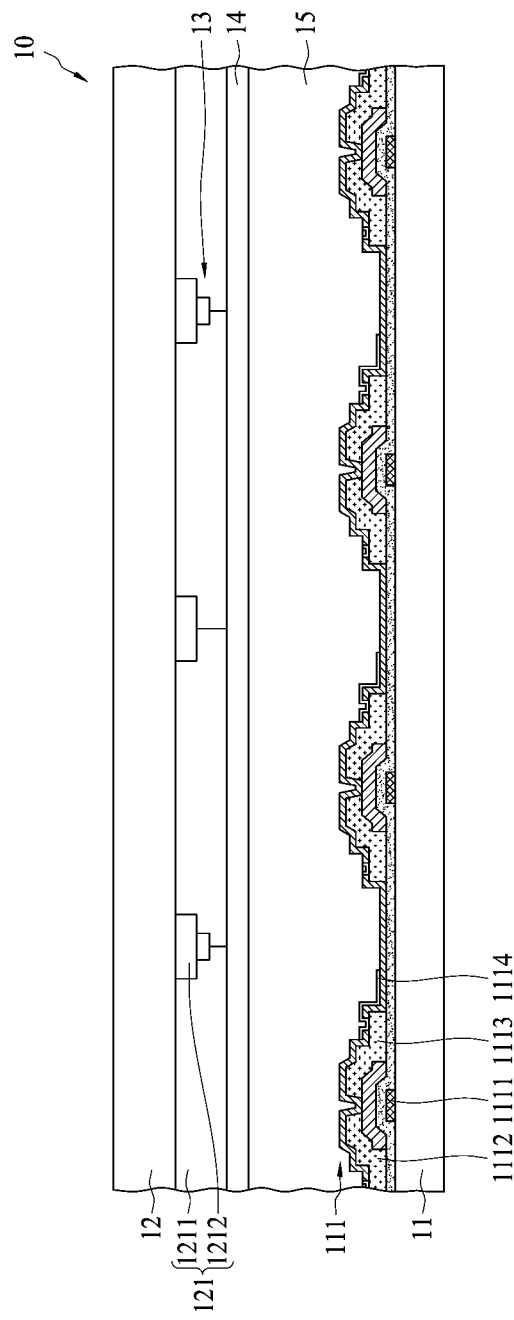
FIG. 1 shows a cross-sectional view of a display with in-cell touch sensor according to an embodiment of the present invention.

FIG. 1 shows a cross-sectional view of a display with in-cell touch panel apparatus according to an embodiment of the present invention. The display 10 comprises a first substrate 11, a second substrate 12 and a touch sensor 13 disposed on the surface of the second substrate 12. A thin-film transistor (TFT) array 111 is disposed on a surface of the first substrate 11. A color filter apparatus 121 comprising a color pixel array is disposed on a surface of the second substrate 12. A polarizer is disposed on the opposite surface of the second substrate 12 (not shown in the figure). However, the applications of the present invention are not just limited to LCD panel only, but can also be applied to self-emitting displays such as AMOLEDs or plasma displays. The active matrix thin-film transistor (TFT) can also be made by amorphous silicon (a-TFT), low-temperature poly-silicon (LTPS), organic TFT, or oxide TFT. The applications should cover any kinds of displays having active-matrix transistor array and color pixel element array in which touch sensor can be integrated into both transistor and pixel arrays to simplified the device structures and hence the process steps.

The color filter apparatus 121 comprises a plurality of color sub-pixels 1211 and a black matrix 1212. The color pixels provide three primary color sub-pixels: red, blue and green. The black matrix 1212 has a grid form and surrounds the plurality of color sub-pixels 1211. A common electrode 14 is disposed on a surface of the plurality of color sub-pixels 1211. The electrical field generated by the common electrode 14 and a pixel electrode 1114 of the TFT array 111 controls the orientation of the liquid crystal molecules of a liquid crystal layer 15. The touch sensor 13 takes the form of a conductive wire extending along the surface of the black matrix 1212 as shown in the figure. On the other hand, the touch sensor 13 can also be disposed between the black matrix 1212 and the second substrate 12. Therefore, the relative layer location between the touch sensor 13 and the black matrix 1212 is not limited by this embodiment. In on embodiment of the present invention, the touch sensor 13 is disposed between the color pixel array 1211 and the polarizer, and the touch sensor 13 can be formed on the second substrate 12 or on a third substrate disposed between the color pixel array 1211 and the polarizer.

Figure 2:
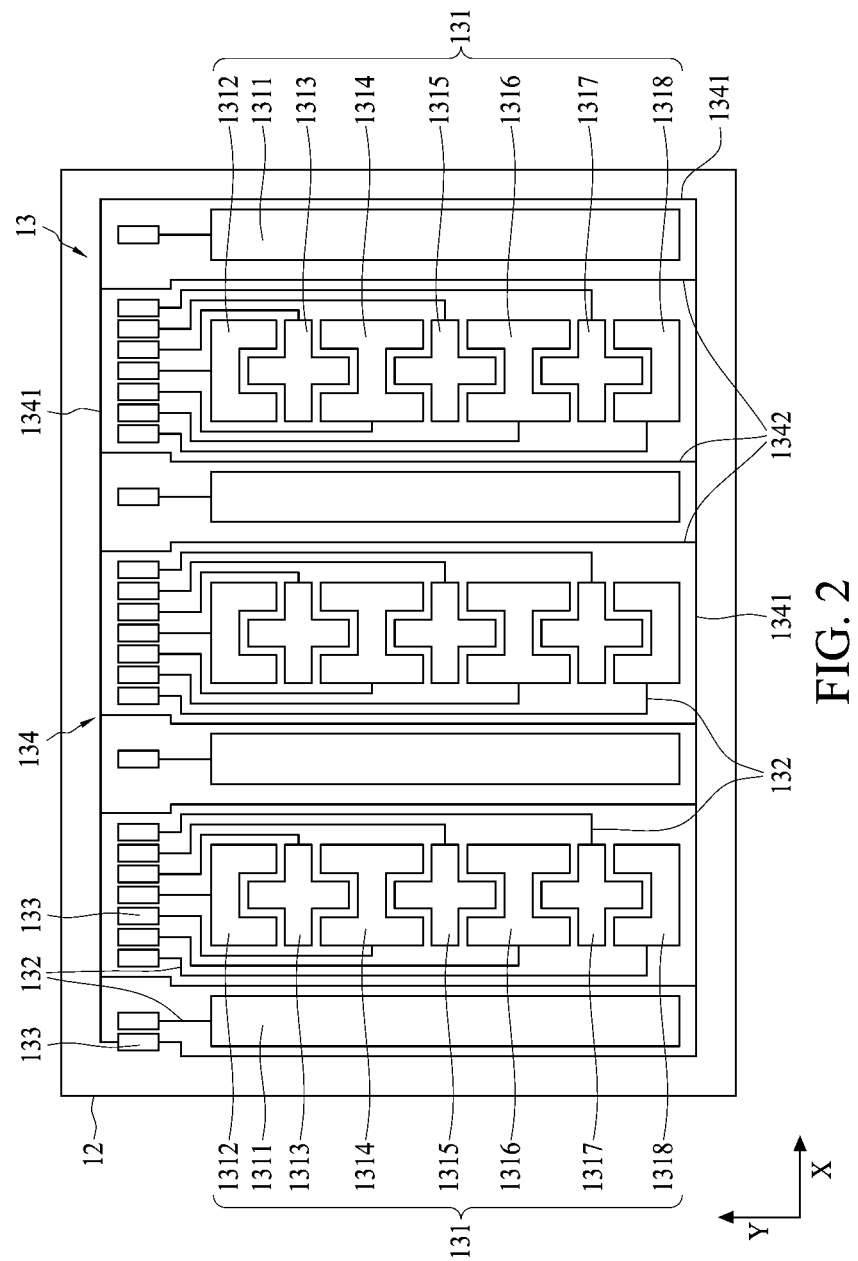
FIG. 2 shows a sensor layout of a touch sensor on a second substrate according to an embodiment of the present invention.

FIG. 2 shows a sensor layout of a touch sensor on a second substrate according to an embodiment of the present invention. The touch sensor 13 disposed on the second substrate 12 comprises a plurality of electrodes 131, a plurality of first leads 132 and a plurality of first pads 133. Each of the first leads 132 is connected to one of the electrodes 131 and one of the first pads 133. The plurality of electrodes 131 can be categorized as a plurality of first electrodes 1311 and a plurality of second electrodes 1312 to 1318. The combination of the first electrodes 1311 extending along the Y-direction (or the second direction) forms a bar electrode. The second electrodes 1312 to 1318 are aligned along the X-direction (or the first direction) to form a plurality of rows. Each of the first leads 132 is connected to each of the electrodes 131 extends upward to one of the first pads 133. Therefore, the electrodes 131 on the second substrate 12 are electrically independent between each other.

A surrounding circuit 134 is disposed around the electrodes 131. The surrounding circuit 134 can function as a protection or shielding circuit disposed around the electrodes 131 to protect the electrodes 131 from false signals caused by interference with external electromagnetic field, or the surrounding circuit 134 can function as a reference electrode 134 to provide a reference level between the electrodes 131 to enhance the sensitivity or signal-to-noise ratio of the touch sensor 13. The surrounding circuit 134 is connected to the first pad 133 shown in the upper left corner shown in FIG. 2 and comprises a conductive wire 1341 and a plurality of conductive wires 1342. The conductive wire 1341 surrounds the outer side of the first pads 133 and the electrodes 131. The conductive wires 1342 are disposed at both sides of the first electrodes 1311. The conductive wire 1341 at the bottom side is not necessarily connected to the conductive wires 1342. However, in such a case, the conductive wire 1341 at the top side is required to be connected to the conductive wires 1342.

Figure 3:
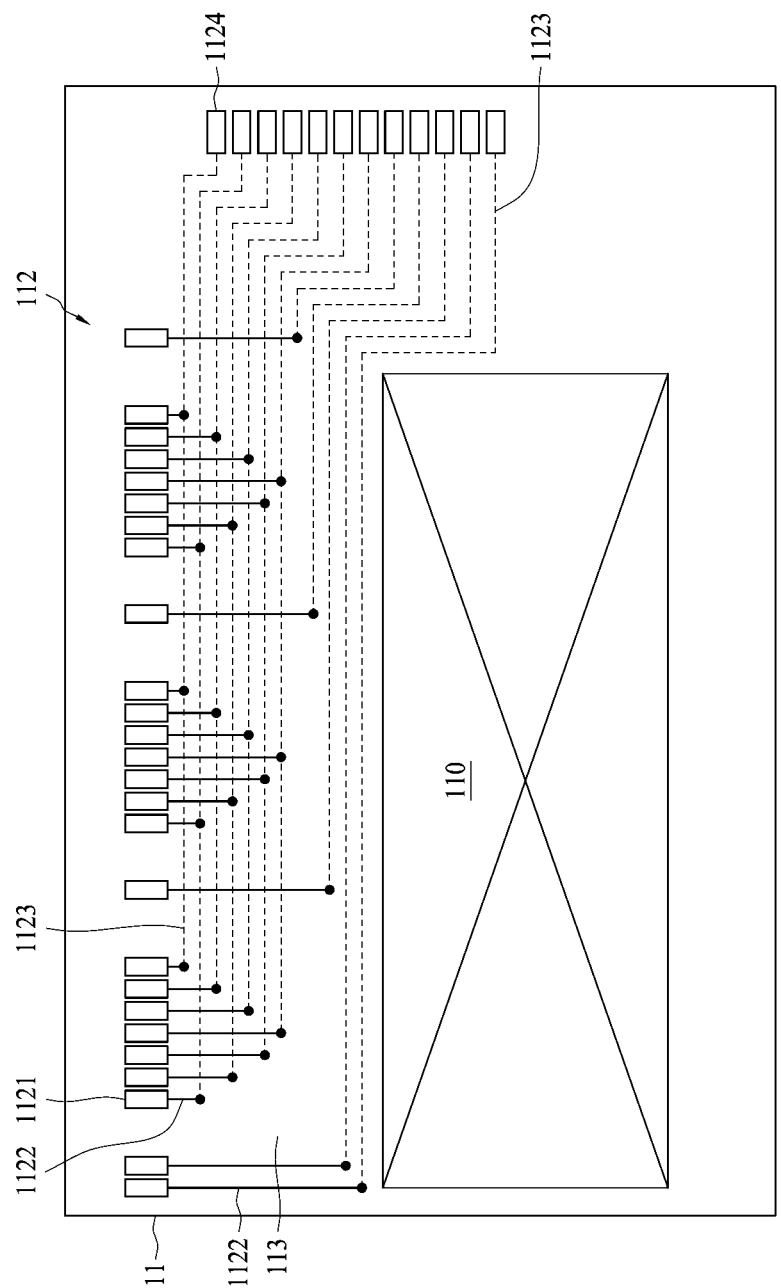
FIG. 3 shows a connecting circuit layout on a first substrate according to an embodiment of the present invention.

FIG. 3 shows a connecting circuit layout on the first substrate according to an embodiment of the present invention. As shown in FIG. 3, a TFT array 110 and a connecting circuit 112 for the touch sensor 13 are disposed on the first substrate 11. The connecting circuit 112 is electrically connected to the touch sensor 13 shown in FIG. 2. And the connecting circuit 112 is also connected to a touch control IC (not shown in the figure). In addition, the manufacture process of the connecting circuit 112 is integrated with the two-metal layer manufacture of the gate electrode 1111 and the source electrode 1112 (or the drain electrode 1113) of the TFT array 111, as shown in FIG. 1. Therefore, there is no additional manufacture process for the connecting circuit 112. In one embodiment of the present invention, the connecting circuit 112 may be formed on a substrate, instead of being formed on the first substrate 11.

The connecting circuit 112 comprises a plurality of second pads 1121, a plurality of second leads 1122, a plurality of connecting wires 1123 and a plurality of terminal pads 1124. Each of the second pads 1121 is electrically connected to one of the first pads 133. A seal adhesive material is used to bond the first substrate 11 to the second substrate 12. The first pads 133 and the second pads 1121 that face each other are electrically connected to each other by anisotropic conductive film, paste, or glue (not shown in the figure), in which the conductive particles when pressed to break will form a conduction channel between first substrate 11 and second substrate 12. Other electrical conducting approaches can also be implemented for each of the first pads 133 and the corresponding second pad 1121 such that one of the first pads 133 is vertically conductive to one of the second pad 1121. The second leads 1122 and the connecting wires 1123 are disposed at different metal layers, similar to gate and source or drain metals in TFT device. That is, the second leads 1122 and the connecting wires 1123 can be at the metal layer containing the source electrode 1112 (or the drain electrode 1113) of the TFT array 111 and the metal layer containing the gate electrode 1111 of the TFT array 111, respectively.

Each of the second leads 1122 is electrically connected to one of the second pads 1121 and one of the connecting wires 1123. Some of the connecting wires 1123 are electrically connected to several of the second leads 1122. And a plurality of vias are formed in the insulation layer 113 between the connecting wires 1123 and the second leads 1122. The plurality of vias is filled with metal or conductive materials and therefore is vertically conductive. The solid dots shown in FIG. 3 mark the locations of these vias. The second leads 1122, which are electrically connected to the connecting wires 1123, are corresponding to the second electrodes 1312 to 1318 aligned along the X-direction. Therefore, although this touch sensor 13 is just a single layer sensor, by combining the sensor layout in first substrate 11 and second substrate 12, the touch sensor 13 can realize a two-dimension touch function in both X and Y to manipulate and sense a finger touch. Each of the terminal pads 1124 is connected to one of the connecting wires 1123. In addition, the plurality of terminal pads 1124 can be connected to a touch control IC (not shown in the figure).

The connecting circuit layout shown in FIG. 3 is formed in the first substrate and integrated into the TFT gate and source or drain metal processes to reduce the manufacturing cost to form this in-cell touch sensor in the first embodiment of the present invention. The connecting circuit can also be formed in the other substrate than the first TFT substrate and the second color pixel array substrate. This substrate can be flexible printing circuit (FPC) or printed circuit board (PCB) with the connecting circuit layout and structure similar to those described in FIG. 2. This structure can also reduce the manufacturing cost to form an in-cell touch sensor since this substrate can integrate both connecting circuit and touch control ICs together in the same substrate. In this case, the touch sensor as described in FIG. 2 can also layout to the other substrate than the second color pixel array substrate and disposed between the polarizer and the second color pixel array substrate. So, these various sensor structures and layout designs offer design flexibilities to the applications where suit most to add one more touch function and apparatus with least manufacturing cost.

Figure 4:
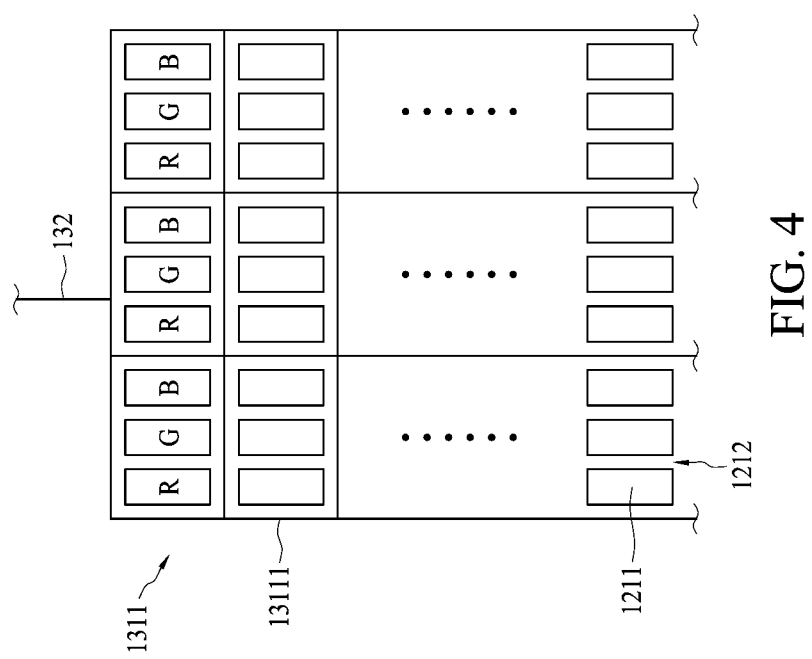
FIG. 4 shows a partial enlarged view of the layout of a plurality of first electrodes between a plurality of color sub-pixels according to an embodiment of the present invention.

FIG. 4 shows a partial enlarged view of the sensor layout of a plurality of first electrodes disposed between a plurality of color sub-pixels according to an embodiment of the present invention. The first electrode 1311 is composed of a conductive wire 13111 arranged in grid manner. The first electrode 1311 is disposed on the black matrix 1212 and arranged between the plurality of color sub-pixels 1211. The plurality of second electrodes 1312 to 1318 are also composed of similar conductive wire arranged in grid manner and also disposed on the black matrix 1212. Accordingly, the transmittance of the light is not affected by the first electrode 1311 and the second electrodes 1312 to 1318 due to the conductive wires are blocked by the black matrix 1212.

Figure 5:
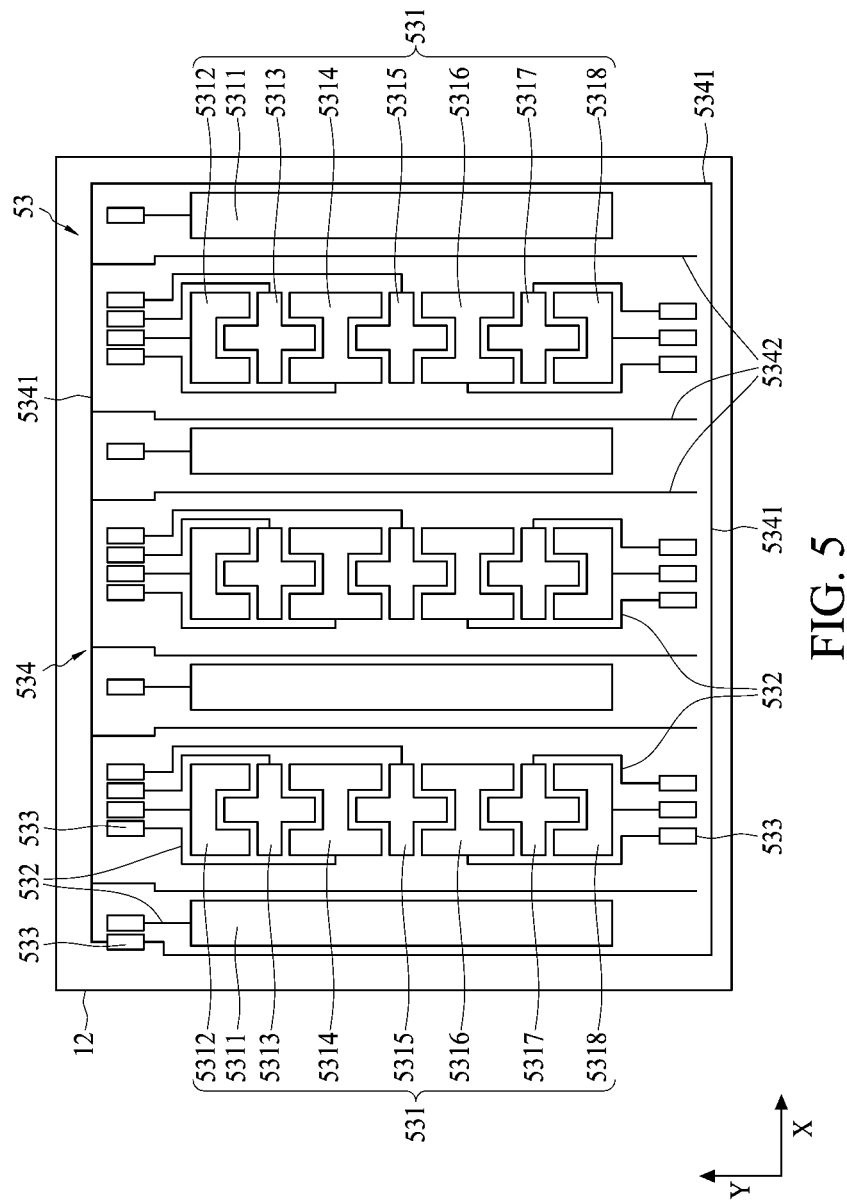
FIG. 5 shows a sensor layout of a touch sensor on a second substrate according to another embodiment of the present invention.

FIG. 5 shows a sensor layout of a touch sensor on a second substrate according to another embodiment of the present invention. In the touch sensor 53, the plurality of first pads 533 are divided into two groups, wherein the first pads 533 in one group are disposed at one side of the second substrate 12, and the first pads 533 in the other group are disposed at the other side of the second substrate 12. In this embodiment, the two groups are disposed at the top side and the bottom side of the second substrate 12, respectively. Accordingly, each of the plurality of first leads 532 extends respectively from the plurality of electrodes 531 upwardly or downwardly and then connected to one of the first pads 533. Comparing to the touch sensor 13 shown in FIG. 2, the length of the first leads 532 extending from the electrodes 531 at the bottom side of the touch sensor 53 is shorter, and thus the resistance of the touch sensor 53 is lower, which results in a better electrical performance. Therefore, the touch sensor 53 in this embodiment is suitable for a large-scale display.

A surrounding circuit 534 is disposed around the electrodes 531. The surrounding circuit 534 can function as a protection or shielding circuit disposed around the electrodes 531 to protect the electrodes 531 from false signal caused by interference with external electromagnetic field, or the surrounding circuit 534 can function as a reference electrode 534 to provide a reference level between the electrodes 531 to enhance the sensitivity or signal-to-noise ratio of the touch sensor 53. The surrounding circuit 534 is connected to the first pad 533 shown in the upper left corner shown in FIG. 5 and comprises a conductive wire 5341 and a plurality of conductive wires 5342. The conductive wire 5341 surrounds the outer side of the first pads 533 and the electrodes 531. The conductive wires 5342 are disposed at both sides of the first electrodes 5311. The conductive wire 5341 at the bottom side is not necessarily connected to the conductive wires 5342. However, in such a case, the conductive wire 5341 at the top side is required to be connected to the conductive wires 5342.

Figure 6:
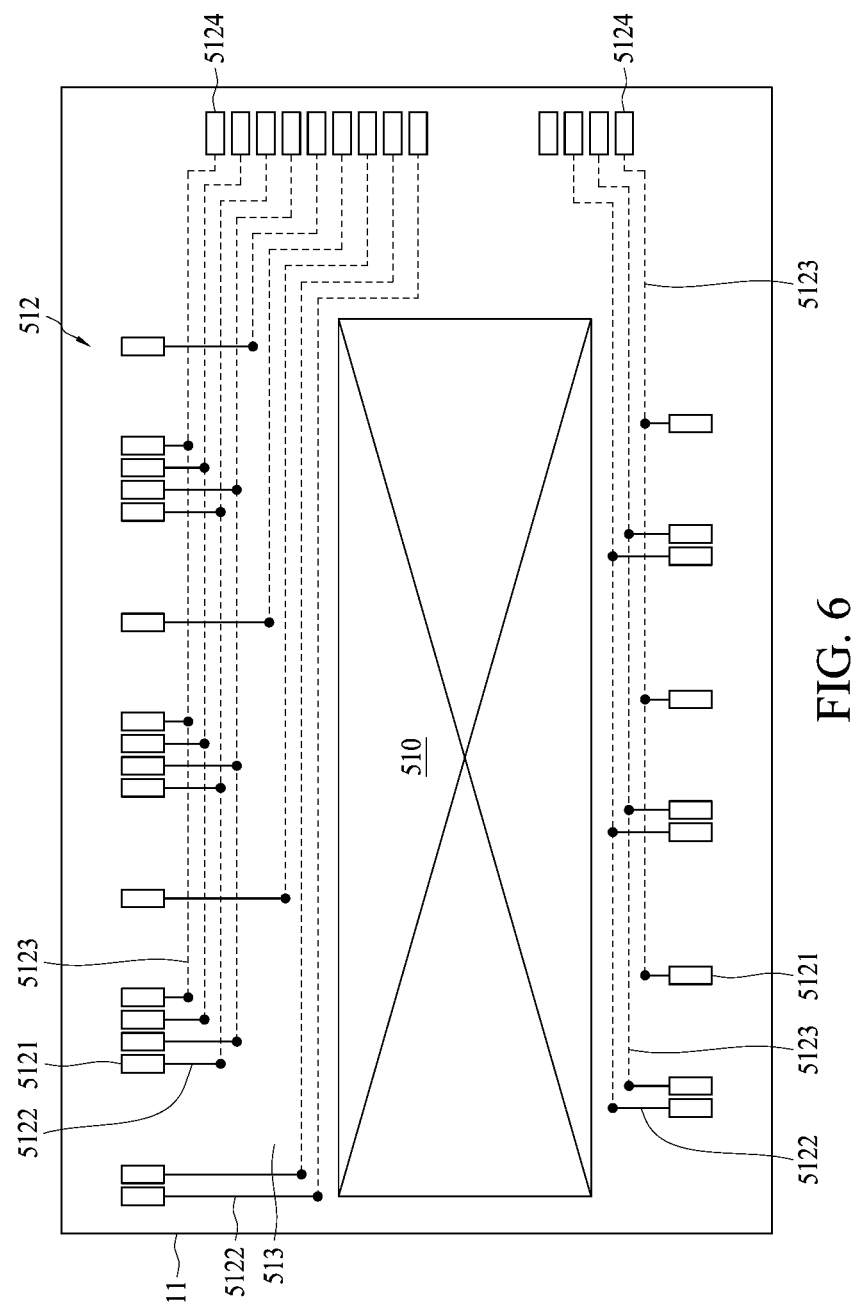
FIG. 6 shows a connecting circuit layout on a first substrate according to another embodiment of the present invention.

FIG. 6 shows a sensor layout on a first substrate according to another embodiment of the present invention. The TFT array 510 and the connecting circuit 512 for the touch sensor 53 are disposed on the first substrate 11. The connecting circuit 512 is used to connect the touch sensor 53 shown in FIG. 5 to a touch control IC (not shown in the figure), and comprises a plurality of second pads 5121, a plurality of second leads 5122, a plurality of connecting wires 5123 and a plurality of terminal pads 5124. The plurality of second pads 5121 are divided into two groups, wherein these two groups are disposed at the top side and the bottom side of the first substrate 11, respectively. Each of the second pads 5121 is electrically connected to one of the first pads 533 as shown in FIG. 5. A seal adhesive material is used to bond the first substrate 11 to the second substrate 12. The first pads 533 and the second pads 5121 that face each other are electrically connected to each other by anisotropic conductive film, paste, or glue (not shown in the figure), in which the conductive particles when pressed to break will form a conduction channel between first substrate 11 and second substrate 12. Other electrical conducting approaches can also be implemented for each of the first pads 533 and the corresponding second pad 5121 such that one of the first pads 533 is vertically conductive to one of the second pad 5121. The second leads 5122 and the connecting wires 5123 are disposed at different metal layers, similar to gate and source or drain metals in TFT device.

Each of the second leads 5122 is electrically connected to one of the second pads 5121 and one of the connecting wires 5123. Similarly, the second leads 5122 and the connecting wires 5123 are also divided into two groups. Some of the connecting wires 5123 are electrically connected to several of the second leads 5122. And a plurality of vias are formed in the insulation layer 513 between the connecting wires 5123 and the second leads 5122. The plurality of vias is filled with metal or conductive materials and therefore is vertically conductive. The solid dot shown in FIG. 6 mark the locations of these vias. The second leads 5122, which are electrically connected to the connecting wires 5123, are corresponding to the second electrodes 5312 to 5318 aligned along the X-direction. The terminal pads 5124 are connected to one of the connecting wires 5123. Therefore, although this touch sensor 53 is just a single layer sensor, by combining the sensor layout in first substrate 11 and second substrate 12, touch sensor 53 can realize a two-dimension touch function in both X and Y to manipulate and sense a finger touch.

Figure 7:
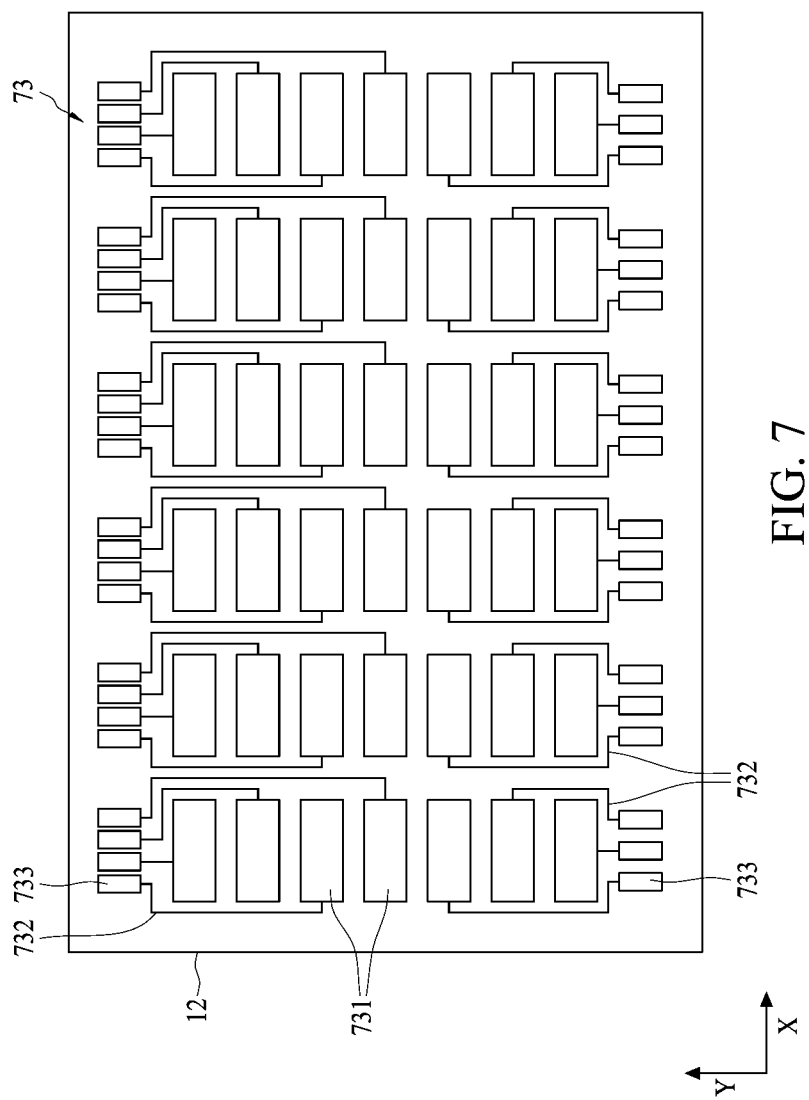
FIG. 7 shows a sensor layout of a touch sensor on a second substrate according to yet another embodiment of the present invention.

FIG. 7 shows a sensor layout of a touch sensor on a second substrate according to yet another embodiment of the present invention. The touch sensor 73 disposed on the second substrate 12 comprises a plurality of electrodes 731, a plurality of first leads 732 and a plurality of first pads 733. Each of the first leads 732 is connected to one of the electrodes 731 and one of the first pads 733. The plurality of electrodes 731 is aligned along the Y-direction to form six columns. The plurality of electrodes 731 is also aligned along the X-direction to form seven rows. Each of the first leads 732 connected to the electrodes 731 extends upwardly or downwardly to one of the first pads 733. In addition, the plurality of the first pads 733 is also divided into two groups to reduce the length of the first leads 732.

Figure 8:
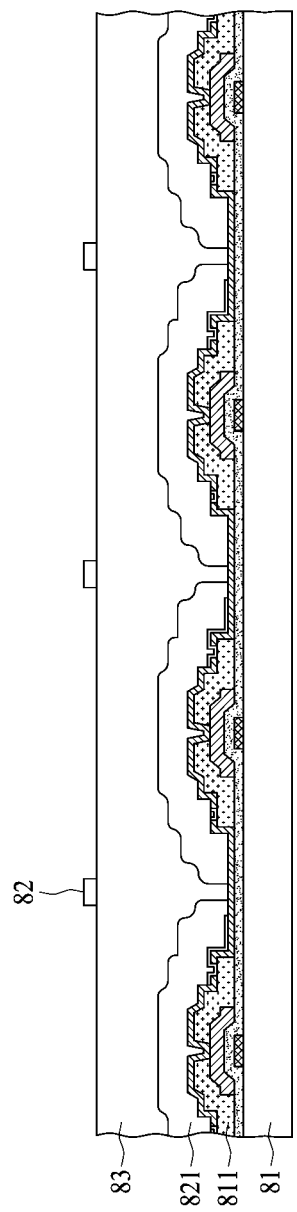
FIG. 8 shows a cross-sectional view of an AMOLED display with in-cell touch sensor according to yet an embodiment of the present invention.

As in the aforementioned description, the applications of the present invention are not just limited to LCD panel only, but can also be applied to self-emitting displays such as AMOLEDs or plasma displays. The following illustrates the application of the present invention to an AMOLED display. FIG. 8 shows a cross-sectional view of an AMOLED display with in-cell touch sensor according to yet an embodiment of the present invention. A thin-film transistor (TFT) array 811 is disposed on a surface of the AMOLED substrate 81. A color pixel array 821 comprising color sub-pixels, formed by the deposition of the OLED materials, is disposed on top of the TFT array 811. A planarization layer or group of sealing layers 83 is disposed on the substrate 81. A touch sensor 82 is disposed on the planarization layer 83. The touch sensor 82 takes the form of a conductive wire extending along the surface of the planarization layer 83 as shown in the figure. On the other hand, the touch sensor 82 can also be disposed between the substrate 81 and the planarization layer 83. Therefore, the relative layer location of touch sensor 82 between the substrate 81 and the planarization layer 83 is not limited by this embodiment as long as the conductive wires of touch sensor are substantially invisible from human eyes based on this layer design. The first and second leads, connecting wires, and pads, as described in the previous embodiments, are disposed in the substrate 81 with processes integrated into the formation of the TFT gate and source or drain metals, which are not shown in this FIG. 8. The vias, vertical connecting first and second pads, can be formed by integrating into the OLED cathode design and deposition, which is also not shown in this FIG. 8.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A display with in-cell touch sensor, comprising:
   a first substrate, wherein a transistor array is disposed on a surface of the first substrate;
   a second substrate, wherein a color pixel array is directly disposed on a surface of the second substrate, and the color pixel array faces and is aligned with the transistor array;
   a touch sensor, directly disposed on an inner surface of the second substrate and comprising a plurality of electrodes, a plurality of first leads and a plurality of first pads, wherein each of the first leads is connected to one of the electrodes and one of the first pads, wherein the inner surface faces the transistor array; and
   a connecting circuit, disposed on the first substrate and comprising a plurality of second pads, a plurality of second leads and a plurality of connecting wires, wherein each of the second leads is connected to one of the second pads and one of the connecting wires, and at least one of the connecting wires is electrically connected to several of the second leads;
   wherein each of the first pads is electrically connected to one of the second pads.

2. The display with in-cell touch sensor of claim 1, wherein the connecting circuit further comprises a plurality of terminal pads, and each of the connecting wires is electrically connected to at least one of the terminal pads.

3. The display with in-cell touch sensor of claim 1, further comprising a surrounding circuit disposed surrounding the plurality of electrodes to function as a protection circuit, a shielding circuit or reference electrode.

4. The display with in-cell touch sensor of claim 3, wherein the surrounding circuit comprises a first conductive wire surrounding the outer side of the plurality of first pads and the plurality of electrodes and a plurality of second conductive wires located at both sides of the plurality of electrodes.

5. The display with in-cell touch sensor of claim 1, wherein each of the electrodes is a conductive wire arranged in grid manner, and the conductive wire is aligned with the interval of the color pixel array and is disposed on the second substrate.

6. The display with in-cell touch sensor of claim 1, wherein the plurality of electrodes comprise a plurality of first electrodes extending along a first direction and a plurality of second electrodes aligned along a second direction.

7. The display with in-cell touch sensor of claim 1, wherein the plurality of second leads are isolated from the plurality of connecting wires by at least an insulation layer, a plurality of vias filled with metal or conductive materials are formed in the at least an insulation layer, and at least one of the connecting wires is electrically connected to several of the second leads through the plurality of vias.

8. The display with in-cell touch sensor of claim 1, wherein the transistor array comprises at least two metal layers, the plurality of second leads are in one metal layer, and the plurality of connecting wires are in another metal layer.

9. A display with in-cell touch sensor, comprising:
   a first substrate, wherein a transistor array is disposed on a surface of the first substrate;
   a second substrate, wherein a color pixel array is directly disposed on a surface of the second substrate, a polarizer is disposed on the other surface of the second substrate, and the color pixel array faces and is aligned with the transistor array;
   a touch sensor, directly disposed on an inner surface of the second substrate and comprising a plurality of electrodes, a plurality of first leads and a plurality of first pads, wherein each of the first leads is connected to one of the electrodes and one of the first pads; and
   a connecting circuit comprising a plurality of second pads, a plurality of second leads and a plurality of connecting wires, wherein each of the second leads is connected to one of the second pads and one of the connecting wires, and at least one of the connecting wires is electrically connected to several of the second leads, wherein each of the first pads is electrically connected to one of the second pads wherein the connecting circuit is disposed on an inner surface of the first substrate, and the inner surface of the first substrate faces the color pixel array on the second substrate.

10. The display with in-cell touch sensor of claim 9, further comprising a surrounding circuit disposed surrounding the plurality of electrodes and the first pads to function as a protection circuit, a shielding circuit or reference electrode.

11. The display with in-cell touch sensor of claim 9, wherein each of the electrodes is a conductive wire arranged in grid manner.

12. The display with in-cell touch sensor of claim 9, wherein the plurality of electrodes comprise a plurality of first electrodes extending along a first direction and a plurality of second electrodes aligned along a second direction.

* * * * *